United States Patent Office 3,308,139
Patented Mar. 7, 1967

3,308,139
CYCLOPROPA-ANDROSTANONE COMPOUNDS
Peter John Palmer, Whitton, Twickenham, England, assignor to Parke, Davis & Company, Detroit, Mich., a corporation of Michigan
No Drawing. Filed Jan. 15, 1965, Ser. No. 425,930
Claims priority, application Great Britain, Feb. 4, 1964, 4,472/64
4 Claims. (Cl. 260—397.4)

This invention relates to novel chemical compounds and means for producing the same. More particularly, the invention relates to 17α-methyl-17β-hydroxycyclopropa-[2α,3α]-5α-androstan-4-one and esters thereof represented by the formula:

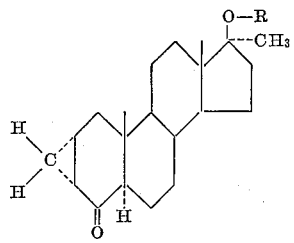

where R is hydrogen or a lower alkanoyl group of not more than four carbon atoms, preferably an acetyl group.

In accordance with the invention, the process for the production of 17α - methyl - 17β - hydroxycyclopropa-[2α,3α]-5α-androstan-4-one comprises reducing a lower alkanoyl ester of 17α-methyl-17β-hydroxycyclopropa-[2α,3α]-androst-5-en-4-one of formula:

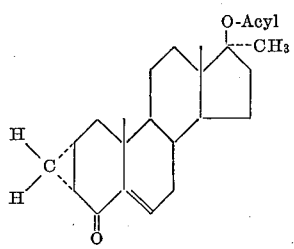

by reaction with lithium in the presence of liquid ammonia, reducing the resultant lower alkanoyl ester of 17α-methyl - 17β - hydroxycyclopropa - [2α,3α] - 5α - androstan-4-one of formula:

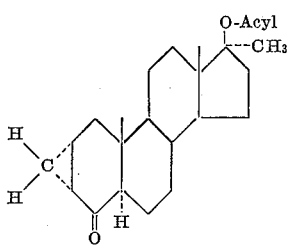

by means of lithium aluminum hydride, and oxidizing the intermediate 17α - methyl - 17β - hydroxycyclopropa-[2α,3α]-5α-androstan-4-ol of formula:

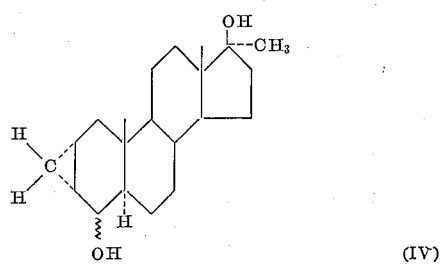

with chromium trioxide and sulfuric acid; where acyl represents a lower alkanoyl group of not more than four carbon atoms, preferably an acetyl group. The reduction of the androstenone starting material is carried out with at least two equivalents of lithium. The reaction is favored by the use of an inert solvent such as ether. Following the initial reaction, which is ordinarily complete within about 30 minutes, the reaction mixture is decomposed with an inorganic salt of a weak base with a strong acid, such as ammonium chloride. The ester product of the reaction (Formula III) can be isolated and purified for purposes of the invention as a final product or it can be further processed, as indicated, to provide the corresponding hydroxyandrostanone of Formula I. The reduction of the ester product is carried out with at least 1.5 molar equivalents of lithium aluminum hydride in an anhydrous inert solvent such as ether or tetrahydrofuran. The reaction is conveniently carried out at room temperature or higher temperature up to the boiling point of the reaction mixture. Following the reaction, which is ordinarily complete in less than one-half hour, the reaction mixture is decomposed in an aqueous medium such as water or dilute acid. The oxidation with chromium trioxide and sulfuric acid is carried out in an inert, water-miscible organic solvent such as acetone, dioxane or tetrahydrofuran. Conveniently, the reaction is run at temperatures in the range from about —20 to 20° C. The reaction is ordinarily complete in a short period, for example, five minutes at 0° C. Any excess oxidant present after the reaction is advantageously decomposed by addition of an alcohol such as methanol.

Also in accordance with the invention, the process for the production of compounds of Formula I where R is a lower alkanoyl group, comprises reacting 17α-methyl-17β-hydroxycyclopropa-[2α,3α]-5α-androstan-4-one with at least one equivalent of an acylating agent, such as an acyl halide or an acid anhydride, derived from an organic acid containing not more than four carbon atoms. Conveniently, the acylation is accomplished by reaction with an acyl halide or an acid anhydride or in two steps by reaction with a lower alkyl Grignard reagent and subsequent reaction of the resulting Grignard compound with an acyl halide. The acylation with acyl halide is carried out with a tertiary amine catalyst such as pyridine or triethylamine at temperatures in the range from 0 to 100° C. for periods from about 2 to 24 hours, preferably from 20 to 30° C. for 14 to 18 hours. The tertiary amine can serve as a solvent or an inert solvent such as diethyl ether or benzene may be used. Acyl halides containing not more than four carbon atoms such as acetyl chloride or propionyl chloride are employed for the reaction. The acylation with acid anhydride is carried out with or without catalyst (tertiary amine catalyst such as pyridine or triethylamine) at temperatures in the range from 20 to 150° C. for one to 18 hours, preferably from 115 to 140° C. for two hours. As a solvent, one may use excess anhydride or a tertiary amine or an inert solvent such as benzene or diethyl ether. The acylation with Grignard reagents and acyl halide is carried out in an inert solvent such as diethyl ether or tetrahydrofuran at temperatures in the range from 0 to 50° C. for one to 18 hours, preferably at 25 to 35° C. for 24 to 48 hours.

The invention also includes the production of the ester compounds of Formula I where R represents a lower alkanoyl group by reducing a cyclopropa-androstenone compound of Formula II with lithium in the presence of liquid ammonia as indicated above.

The compounds of the invention possess useful pharmacological properties. In particular, when administered by the oral or parenteral routes, the compounds exhibit significant myotropic activity yet have relatively low androgenic side effects; hence, they have application as anabolic agents. The compounds are also useful as intermediates for the production of other steroids. A preferred anabolic agent of the invention is 17α-methyl-17β-hydroxycyclopropa-[2α,3α]-5α-androstan-4-one.

The cyclopropa-androstenone ester starting materials for the process of the invention can be prepared in five steps from 2-methylene-17α-methyl-17β-hydroxyandrost-4-en-3-one, as follows: the latter compound is reacted with hydrazine to form the 2α,3α-cyclopropa derivative, the cyclopropa compound is acylated at the 17-hydroxy position, the resulting ester is hydroxylated at the 4- and 5-positions by treatment with osmium tetroxide, the resulting diol is converted to the corresponding 5α-hydroxyandrostan-4-one by oxidation with chromium trioxide and sulfuric acid, and the latter intermediate is dehydrated with thionyl chloride in the presence of pyridine to give the corresponding androst-5-en-4-one.

The invention is illustrated by the following examples.

*Example 1*

(a) A solution of 17α-methyl-17β-hydroxycyclopropa-[2α,3α]-androst-5-en-4-one, acetate ester (5 g.) in ether (100 ml.) is added over a period of twenty minutes to a solution of lithium (0.5 g.) in liquid ammonia (300 ml.). The mixture is stirred an additional ten minutes, and then ammonium chloride is added in amount sufficient to decolorize the mixture. The ammonia is removed from the mixture by evaporation and the residue extracted with two 50-ml. portions of ether. The combined ether extract is washed with water, dried and the ether removed by evaporation. The residual product is 17α-methyl-17β-hydroxycyclopropa - [2α,3α]-5α-androstan-4-one, acetate ester. The product can be purified by adsorption on alumina, elution with benzene and crystallization from acetone, or it can be used directly as an intermediate without further purification. By replacing the acetate ester starting material in this procedure with an equivalent amount of the corresponding propionate ester one obtains 17α - methyl - 17β - hydroxycyclopropa-[2α,3α]-5α-androstan-4-one, propionate ester.

(b) 17α - methyl - 17β - hydroxycyclopropa-[2α,3α]-5α-androstan-4-one, acetate ester [the product of Example 1(a)] is dissolved in ether (100 ml.) and the solution is stirred with lithium aluminum hydride (2.5 g.) for ten minutes at room temperature. The reaction mixture is decomposed by the addition of water (25 ml.) and cold dilute sulfuric acid (1.0 N, 150 ml.) and is then extracted with two 50-ml. portions of ether. The combined extract is washed with water, dried and the ether removed by evaporation. The residual product, 17α-methyl-17β-hydroxycyclopropa-[2α,3α]-5α-androstan-4-ol, is dissolved in acetone (500 ml.) and at 0° C. five ml. of Jones Reagent (26.72 g. of chromium trioxide and 23 ml. of sulfuric acid diluted to 100 ml. with water) is added over a period of two minutes. After stirring for three additional minutes at the same temperature, methanol (100 ml.) is added, and the solvent is then removed under vacuum. The residual product, 17α-methyl-17β-hydroxycyclopropa-[2α,3α]-5α-androstan-4-one, is purified by adsorption from a benzene solution on neutral alumina (Woelm, activity grade III) and elution with benzene and benzene-petroleum ether (1:1); M.P. 189–191° C. following removal of the eluant. The same product is obtained by replacing the acetate ester starting material in this procedure with an equivalent amount of the corresponding propionate ester.

The preparation of ester starting materials for the above procedure is illustrated by the synthesis of the acetate ester described as follows: hydrazine hydrate (10 ml.) is added to diethylene glycol (150 ml.) and the solution heated to 180° C. under nitrogen. 2-methylene-17α-methyl-17β-hydroxyandrost-4-en-3-one (5 g.) is added and the solution is heated at reflux for 30 minutes. A solution of sodium (2 g.) in diethylene glycol (50 ml.) is added. The reaction temperature is increased to 210° C. and excess hydrazine hydrate removed by distillation. The solution is then heated at reflux for four hours and is finally cooled and poured into 500 ml. of water. The mixture is extracted with ether, dried and concentrated. The residual product, 17α-methyl-cyclopropa-[2α,3α]-androst-4-en-17β-ol, is purified by adsorption on alumina, elution with benzene and crystallization from acetone, M.P. 121–123° C. A solution of the androstenol (1 g.) in pyridine (5 ml.) and acetic anhydride (5 ml.) is refluxed for three hours, then cooled and poured into water (50 ml.). The mixture is extracted with ether, and the extract is washed in turn with dilute acid, water, dilute base, and water and then concentrated. The product, 17α- - methyl - cyclopropa-[2α,3α]-androst-4-en-17β-ol, acetate ester (M.P. 78–80° C. from acetone), is dissolved in the amount of 871 mg. in ether (15 ml.) together with osmium tetroxide (1 g.) and pyridine (1 ml.) and allowed to stand overnight at room temperature. The resulting mixture is dissolved in methylene chloride and the solution is saturated with hydrogen sulfide. The mixture is filtered, and the filtrate is washed with dilute acid, water, dilute base and water and then is dried and concentrated. The residual product, 17α-methyl-17β-acetoxy-4α,5α-dihydroxy-cyclopropa-[2α,3α]-androstane, is dissolved in acetone (50 ml.) at 0 to 5° C. One ml. of Jones Reagent [chromium trioxide (26.72 g.) and sulfuric acid (23 ml.) diluted to 100 ml. with water] is added with stirring to this solution over a period of one minute. The mixture is stirred four minutes longer and is then diluted with methanol (25 ml.). The solution is concentrated to 10 ml., diluted with water (50 ml.) and extracted with ether. The extract is washed with water, aqueous sodium bicarbonate and water, and is then dried and concentrated. The residual product, 17α-methyl-17β-acetoxy-5α-hydroxycyclopropa-[2α,3α]-androstan-4-one, is purified by adsorption on alumina, elution with benzene, and crystallization from aqueous methanol, M.P. 201–203° C. Thionyl chloride (0.5 ml.) is added dropwise to a stirred solution of the androstanone (0.5 g.) in pyridine (10 ml.) at 0 to 5° C. The mixture is stirred for ten minutes and then poured onto ice and extracted with ether. The extract is washed with dilute hydrochloric acid and with water and is then dried and concentrated by removal of ether. The residual product is the desired starting material, 17α - methyl-17β-hydroxycyclopropa-[2α,3α]-androst-5-en-4-one, acetate ester; M.P. 155–159° C. from acetone.

*Example 2*

A solution of 1.0 g. of 17α-methyl-17β-hydroxycyclopropa-[2α,3α]-5α-androstan-4-one in 5 ml. of pyridine and 5 ml. of acetic anhydride is heated at reflux for 3 hours, and is then cooled and poured into 50 ml. of water. The mixture is extracted with two 25-ml. portions of ether. The combined ether extract is washed successively with dilute hydrochloric acid, water, aqueous sodium bicarbonate and water and is dried and concentrated by evaporation of ether. The residual product, 17α - methyl - 17β-hydroxycyclopropa-[2α,3α]-5α-androstan-4-one, acetate ester, is purified by crystallization from acetone. When an equivalent amount of a propionyl halide (such as propionyl chloride) is substituted for the acetic anhydride in this procedure, the product is the corresponding propionate ester.

I claim:
1. Cyclopropa-[2α,3α]-5α-androstan-4-one compounds of the formula:

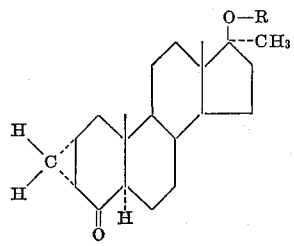

where R is a member of the group consisting of hydrogen and lower alkanoyl.
2. 17α - methyl - 17β-hydroxycyclopropa-[2α,3α]-5α-androstan-4-one.
3. 17α - methyl - 17β-hydroxycyclopropa-[2α,3α]-5α-androstan-4-one, acetate ester.
4. Process for the production of 17α-methyl-17β-hydroxycyclopropa-[2α,3α]-5α-androstan-4-one, which comprises reducing a lower alkanoyl ester of 17α-methyl-17β-hydroxycyclopropa-[2α,3α]-androst-5-en-4-one of formula:

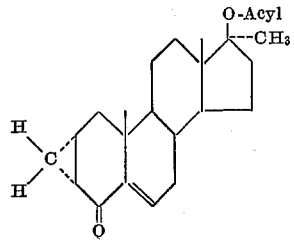

by reaction with lithium in the presence of liquid ammonia, reducing the resultant lower alkanoyl ester of 17α - methyl - 17β-hydroxycyclopropa-[2α,3α]-5α-androstan-4-one of formula:

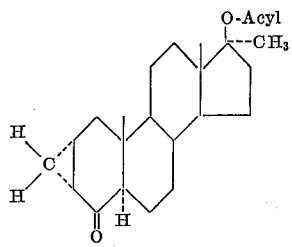

by means of lithium aluminum hydride, and oxidizing the intermediate 17α - methyl - 17β-hydroxycyclopropa-[2α,3α]-5α-androstan-4-ol of formula:

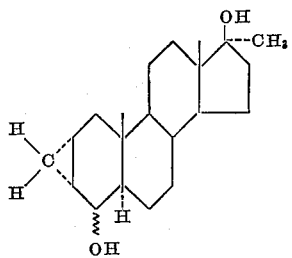

with chromium trioxide and sulfuric acid; where acyl represents a lower alkanoyl group of not more than four carbon atoms.

References Cited by the Examiner

Barton et al.: Chem. Soc. Jour., pp. 3045–51 (1954).
Loewenthal: Tetrahedron, vol. 6, pp. 269–303, June 1959, pp. 299–301.

ELBERT L. ROBERTS, *Acting Primary Examiner.*

HENRY FRENCH, *Assistant Examiner.*